United States Patent Office 3,501,486
Patented Mar. 17, 1970

3,501,486
PROCESS FOR THE PRODUCTION OF
2-PYRIDINE ALDOXIMES
Arthur B. Ash, Detroit, Mich., Francis A. Daniher, Westfield, N.J., and Brennie E. Hackley, Jr., Joppa, Md., assignors to Ash Stevens, Inc., Detroit, Mich., a corporation of Michigan
No Drawing. Filed Apr. 28 1967, Ser. No. 634,453
Int. Cl. C07d 31/42
U.S. Cl. 260—296                                    10 Claims

ABSTRACT OF THE DISCLOSURE

A process for preparing 2-pyridine aldoximes by the reaction of 2-chloromethylpyridines with hydroxylamine in solution in a mixture of water and a water-miscible organic solvent in the pH range of 5 to 9. A process for preparing the 2-chloromethylpryridine precursors by the reaction of 2-methylpyridine N-oxides with p-tolylsulfonyl chloride or methylsulfonyl chloride is disclosed.

BACKGROUND OF THE INVENTION

This invention concerns a process for the production of 2-pyridine aldoximes including substituted 2-pyridine aldoximes. More specifically, this invention concerns a process for the conversion of 2-chloromethylpyridine and substituted 2-chloromethylpyridines to the corresponding 2-pyridine aldoximes. The term "substituted 2-pyridine aldoximes" used herein means those 2-pyridine aldoximes which have atoms and groups other than hydrogen attached to one or more of the carbon atoms of the pyridine ring.

The use and study of 2-pyridine aldoxime methiodides and related compounds as anticholinesterase reactivators have stimulated interest to find more convenient processes for their production. An important step in the production of these compounds is the preparation of the 2-pyridine aldoxime or substituted pyridine aldoxime intermediates.

One of the methods of production of 2-pyridine aldoximes used commonly in the past is that described by Bockleheide and Linn (J. Am. Chem. Soc. 76, 1286 (1954)) and Traynelis and Pacini (J. Am. Chem. Soc., 86, 4917 (1964)). According to this method, 2-picoline N-oxide undergoes a rearrangement reaction with acetic anhydride producing the acetate of 2-pyridine methanol which is then hydrolyzed to the 2-pyridine methanol. The 2-pyridine methanol is oxidized to the corresponding aldehyde which is converted to the oxime by the classical reaction with hydroxylamine. The oxidation is usually done with selenium oxide and low yields are encountered. The overall yield for this sequence of reactions as applied to a series of substituted 2-picoline N-oxides has been reported by Furukawa (Yakugaku Zasshi 77, No. 1, 11 (1957)) to be about 20 to 30 percent. The disadvantages of the necessity of using several reaction steps giving low yields are obvious to those skilled in the art.

The direct, quite efficient oximation of 2-picoline with sodium amide and n-butyl nitrite in liquid ammonia has been reported by Forman (J. Org. Chem., 29, 3323 (1964)). However, the disadvantages associated with the use of liquid ammonia, especially for the production of larger than laboratory quantities of these products, will be obvious.

The discovery of better processes for the production of these pyridine aldoximes is important. It is thus an object of this invention to provide a process for the production of 2-pyridine aldoxime and substituted 2-pyridine aldoximes which is more convenient and more economical than those known in the art. Other objects will become apparent as this invention is described.

SUMMARY OF THE INVENTION

According to this invention, 2-pyridine aldoxime and substituted 2-pyridine aldoximes are produced by reacting a 2-chloromethylpyridine with at least two molar equivalents of hydroxylamine at elevated temperatures in a mixture of water and a water-miscible organic solvent in which the 2-chloromethylpyridine is soluble, at a pH of the mixture of between about 5 and 9. The 2-pyridine aldoxime or substituted 2-pyridine aldoxime is then separated from the reaction mixture.

In addition to 2-pyridine aldoxime, a large variety of substituted 2-pyridine aldoximes can be produced by this process. Examples are those which have the following substituted groups: 5-methyl; 6-methyl; 5-ethyl; 4-carbethoxy; 5-carbethoxy; 4-chloro; 5-chloro. Substituted 2-pyridine aldoximes having groups in the 4- and 6-positions which are subject to nucleophilic displacement undergo side reactions to varying degrees. This results in lower yields of product than otherwise obtainable. An example is 4-chloro-2-pyridine aldoxime which is produced in only 18 percent yield from 4-chloro-2-chloromethylpyridine by this process because of displacement of the 4-chloro group.

DESCRIPTION OF THE INVENTION

The starting materials used in the process of this invention, 2-chloromethylpyridine and substituted 2-chloromethylpyridines are prepared by known methods. Some of these starting materials can be prepared by direct chlorination of the corresponding 2-methylpyridine, a method described by Mathes and Schuly (Angew. Chem. Int. Ed., 2, No. 3, 144 (1963)). A more general method for preparing these starting materials is that described by Matsumara (J. Chem. Soc. Japan, 74, 363—4, 446—8 (1953)). According to Matsumara, 2-chloromethylpyridine is prepared by the reaction of 2-methylpyridine N-oxide with p-tolylsulfonyl chloride. It has been found that methylsulfonyl chloride is also useful for this purpose. This method, either with p-tolylsulfonyl chloride or with methylsulfonyl chloride, has been found to be generally applicable to the preparation of substituted 2-chloromethylpyridines. The 2-chloromethylpyridine compounds are slightly unstable and are used soon after their production or they are stored as their picric acid salts or other convenient salts such as their hydrochlorides until needed.

Stoichiometrically, two moles of hydroxylamine are required for each mole of the 2-chloromethylpyridine employed. It is useful however to employ an excess of hydroxylamine in order to obtain the best yields of product. The use of too large an excess is wasteful of hydroxylamine. An excess of hydroxylamine in the range of about 100 percent to about 250 percent is preferred. Stated alternatively, it is preferred to use between about four and seven moles of hydroxylamine for each mole of the 2-chloromethypyridine employed.

Hydroxylamine is available in the form of salts of hydroxylamine and inorganic acids. Examples of such salts of hydroxylamine are: hydroxylamine hydrochloride, $H_2NOH \cdot HCl$; hydroxylamine nitrate, $H_2NOH \cdot HNO_3$;

hydroxylamine sulfate, $H_2NOH \cdot \frac{1}{2}H_2SO_4$. Although hydroxylamine, as the free base, is useful in carrying out this invention, it is preferred to employ one of these salts of hydroxylamine. Of these salts, hydroxylamine hydrochloride is preferred.

The organic solvent which is used in admixture with water is a water-miscible organic solvent in which the 2-chloromethylpyridine compound is appreciably soluble. Examples of such organic solvents are the lower alkanols containing one to six carbon atoms, particularly methanol, ethanol, propanol and isopropanol, dimethylformamide, the dioxanes, and other water-miscible cyclic ethers such as tetrahydrofuran. Ethanol is preferred.

The ratio of the quantity of water-miscible organic solvent to the quantity of water in the liquid reaction medium depends principally on the relative solubilities of the various starting materials and reaction products in the organic solvent, water and mixtures thereof. It is preferred to use a mixture of the organic solvent and water in proportions such that there is optimum solubility of the 2-chloromethylpyridine, hydroxylamine hydrochloride, and the reagent controlling the pH at the operating temperature. This condition is obtained when the ratio, by volume, of organic solvent to water is in the range of about 0.4 to about 2. It is convenient to use a ratio within this range at the outset of the reaction, followed by occasional additions of the organic solvent as the reaction proceeds and the inorganic base and hydroxylamine hydrochloride are consumed. When ethanol is employed as the organic solvent, the preferred ratio is in the range of about 0.8 to 1.2.

In carrying out the process of this invention, the pH of the reaction mixture is adjusted to within the range of about 5 to 9. It is preferred to adjust the pH to within the range of 6 to 8 because it is within this range that yields are greatest. When the hydroxylamine is supplied to the reaction mixture in the form of one of its salts, such as hydroxylamine hydrochloride, the pH is adjusted by the addition of a sufficient amount of a base of sufficient basic strength. Examples of inorganic bases which can be used are: the alkali metal hydroxides, calcium hydroxide, sodium acetate, potassium acetate, sodium carbonate, potassium carbonate. Of the inorganic bases, the alkali metal hydroxides, as for example, sodium hydroxide and potassium hydroxide are preferred. It is useful to add the inorganic base as a quite highly concentrated solution of the inorganic base in water. When sodium hydroxide and potassium hydroxide are used as the inorganic base, the use of a 10 Normal solution is convenient. However, this is not critical.

Organic bases which do not react with either the chloromethylpyridine or hydroxylamine and which are stronger bases than hydroxylamine can also be used to adjust the pH of the reaction mixture. Examples of useful organic bases are aliphatic tertiary amines such as trimethylamine, triethylamine, tripropylamine, and tri-isobutylamine. When the process of this invention is carried out at atmospheric pressure with an organic base it is preferred that the organic base have a boiling point not less than the temperature at which the reaction mixture is heated during the reacting step. Alternatively, an organic base having a relatively lower boiling point can be used if the reaction is carried out within an enclosed system at a pressure greater than atmospheric pressure. Triethylamine is the preferred organic base.

The process of this invention is carried out at an elevated temperature. The temperature range of about 65° C. to about 120° C. is preferred. This is the temperature range within which the reaction proceeds to give good yields of product and within which the mixtures of water and the water-miscrible organic solvents boil under reflux at atmospheric pressure. Temperatures in the range of about 65° C. to about 100° C. are conveniently obtained by heating the vessel containing the reaction mixture on a steam bath. Alternatively the reaction mixture can be heated by other means in the temperature range of from about 65° C. to about 120° C.

A reaction time of at least about one hour is necessary to obtain greatest yields of product. For large batches longer times are necessary but usually optimum yields are obtained within a six-hour heating period. It will be recognized that some substituted 2-chloromethylpyridines react more rapidly than others and that the reaction time used for particular reactants and products might be dictated by the presence of other groups attached to the pyridine nucleus which undergo side reactions under these reaction conditions.

The 2-pyridine aldoxime or substituted 2-pyridine aldoxime produced in the reaction mixture is isolated by allowing the mixture to cool to room temperature or slightly lower. In the case of 2-pyridine aldoximes which are insoluble in water but soluble in the organic solvent, it is often beneficial to dilute the mixture with water. The solid which crystallizes out is filtered and recrystallized from appropriate solvents. Aqueous ethanol and benzene are convenient for this purpose. It is sometimes useful to wash the isolated solid with water, prior to recrystallization, in order to remove inorganic materials which might also have crystallized from the cooled reaction mixture. As a modification, higher yields of certain products which are quite soluble in the cooled reaction mixture can be obtained by distilling off all or a substantial portion of the solvents used as the reaction medium. In those instances wherein the 2-pyridine aldoxime has appreciable solubility in water, the water is distilled off completely and the desired product is extracted with a suitable solvent in which it is soluble, such as benzene or ether, from the residue.

A general description of this invention having been presented, the following examples will describe in detail the manner in which this invention is used to produce several specific 2-pyridine aldoximes.

In the example, the particular 2-chloromethylpyridine compounds used as starting materials were prepared by the reaction of the corresponding 2-methylpyridine N-oxide with methylsulfonyl chloride or p-tolylsulfonyl chloride. Illustrative of this method of preparation of these starting materials is the following description of the preparation of 2-chloromethylpyridine:

Example I(a)

A mechanically agitated solution of 10.0 grams (0.108 mole) of 2-methylpyridine N-oxide and 22.0 grams (0.192 mole) of methyl sulfonyl chloride in 100 milliliters of dry dioxane was heated for seven hours in an oil bath maintained at 100°–105° C. The resulting mixture was cooled and the dioxane was evaporated under reduced pressure. The residue was triturated with ether to remove excess methylsulfonyl chloride and was then made basic by the addition of excess saturated sodium bicarbonate solution. The aqueous mixture was extracted with three 25-milliliter portions of benzene, and the combined benzene extracts were dried over anhydrous sodium sulfate and filtered. Distillation resulted in 6.8 grams (58 percent of theoretical) of 2-chloromethylpyridine boiling at 25° C. at 0.2 mm. pressure. The picric acid salt of the product melted at 147°–150° C. This is close to the melting point of 149°–150° C. reported for this derivative by W. Mathes and H. Schuly (Angew. Chem. Internat. Edit., 2, No. 3, 144 (1963)).

Example I(b)

2-chloromethylpyridine prepared in Example I(a) was used in this example. The pH of a solution of 3.5 grams (0.05 mole) of hydroxylamine hydrochloride in 25 milliliters of water was adjusted to between about 7 and 8 by the addition of 5 Normal sodium hydroxide solution. To this solution was added 1.27 grams (0.01 mole) of 2-chloromethylpyridine dissolved in 10 milliliters of absolute ethanol. This mixture was heated on the steam bath for three hours. The solvent mixture was removed by distillation under reduced pressure and the solid residue was extracted with ether. Insoluble solid was filtered off and the ether was evaporated to leave 0.64 gram of crude product. This material was recrystallized from benzene to obtain 0.60 gram (49 percent yield based on 2-chloromethylpyridine) of 2-pyridine aldoxime, melting at 112°–114° C. This melting point is the same as reported by Ginsberg and Wilson (J. Am. Chem. Soc., 79, 481 (1957)). The melting point of a mixture of this product with authentic 2-pyridine aldoxime prepared by an alternate route was not depressed.

Example II

The 2-chloromethyl-5-carbethoxypyridine used in this example was prepared by reaction of 1-methyl-5-carbethoxypyridine N-oxide with methylsulfonyl chloride in refluxing dioxane in the manner previously described in Example I(a). The compound was distilled under reduced pressure, the major portion boiling at 65° C. and 0.05 mm. pressure. The picric acid salt of this compound melted at 122°–123° C. 2-chloromethyl-5-carbethoxypyridine, 4.1 grams (0.02 mole) and 7.0 grams (0.1 mole) of hydroxylamine hydrochloride were dissolved in 40 milliliters of a 50:50 by volume mixture of water and ethanol. The pH of this reaction mixture was adjusted to between 7 and 8 by addition of 10 Normal sodium hydroxide solution. The reaction mixture was heated on a steam bath for two hours, during which time sufficient ethanol was added occasionally to maintain a homogeneous solution. The product which separated from the cooled mixture was filtered and recrystallized from benzene to give 2.85 grams (72 percent yield based on 2-chloromethyl-5-carbethoxypyridine) of product melting at 126°–128° C. Elemental analysis of the recrystallized product showed: Carbon, 55.86%; hydrogen, 5.42%; nitrogen, 14.07%. Calculated values based on 5-carbethoxy-2-pyridine aldoxime are: Carbon, 55.66%; hydrogen, 5.19%; nitrogen, 14.42%.

Example III 2-chloromethyl-5-methylpyridine used in this example was prepared by the reaction of 2,5-dimethylpyridine N-oxide with p-tolylsulfonyl chloride in refluxing dioxane in the manner similar to that previously described in Example I(a) and distilled, the major portion boiling at 46–48° C. at 0.6 mm. pressure. The picric acid salt of this compound melted at 158°–160° C. The 2-chloromethyl-5-methylpyridine, 1.41 grams (0.01 mole) and 3.5 grams (0.05 mole) of hydroxylamine hydrochloride were dissolved in 20 milliliters of a 50:50 by volume mixture of water and ethanol. The pH of the reaction mixture was adjusted to between 7 and 8 by the addition of 10 Normal sodium hydroxide solution and the mixture was heated on a steam bath for two hours. Ethanol was added occasionally so as to maintain a homogeneous solution. The solid which crystallized from the reaction mixture was filtered and recrystallized from benzene to give 0.75 gram (55 percent yield based on 2-chloromethyl-5-methylpyridine) of product melting at 157–158.5° C. This melting point corresponds to that reported by Mathes and Sauermilch (Chem. Ber., 90, 758 (1957)).

Examples IV–VIII

In a manner similar to that described in Examples I–III, five other substituted 2-pyridine aldoximes were produced from the corresponding substituted 2-chloromethylpyridines. These aldoximes and those of Examples I–III are listed in Table I along with the percent yield based on the 2-chloromethylpyridine starting material and their melting points. All of the 2-chloromethylpyridines were prepared by the reaction of the corresponding 2-methylpyridine N-oxides with methylsulfonyl chloride or p-tolylsulfonyl chloride in refluxing dioxane in the manner similar to that previously described in Example I(a). Boiling points of the 2-chloromethylpyridines and melting points of the picric acid salts of the 2-chloromethylpyridines are also included in Table I.

TABLE I.—PRODUCTION OF 2-PYRIDINE ALDOXIMES FROM 2-CHLOROMETHYLPYRIDINES

| Example | Substituent | 2-chloromethylpyridine B.P. (° C./mm. pressure) | Picrate, M.P. (° C.) | 2-pyridine aldoxime Yield (percent) | 2-pyridine aldoxime M.P. (° C.) |
|---|---|---|---|---|---|
| I | Unsubstituted | 25/0.2 | 147–150 | 50 | 112–114 |
| II | 5-carbethoxy | 65/0.05 | 122–123 | 72 | 128–129 |
| III | 5-methy- | 46–48/0.6 | 158–160 | 55 | 157–158.5 |
| IV | 6-methy- | 38/0.7 | 159–161 | 83 | 170–171 |
| V | 5-ethyl- | 45/0.25 | 120–121 | 78 | 149–150 |
| VI | 4-carbethoxy | 75/0.12 | 110–111 | 52 | 157–158 |
| VII | 4-chloro- | 51/0.9 | 123–125 | 18 | 151–153 |
| VIII | 5-chloro | 50/0.5 | 96–98 | 63 | 194–195 |

The melting point of the product of Example IV, 6-methyl-2-pyridine aldoxime, agreed with that reported by Ginsberg and Wilson (J. Am. Chem. Soc., 79, 481 (1957)). Elemental analysis of the product of Example V, 5-ethyl-2-pyridine aldoxime showed: Carbon, 64.17%; hydrogen, 6.95%; nitrogen, 18.53%. Calculated for this structure: Carbon, 64.00%; hydrogen, 6.70%; Nitrogen, 18.65%. Elemental analysis of the product of Example VI, 4-carbethoxy-2-pyridine aldoxime, showed: Carbon, 55.39%; hydrogen, 5.29%; nitrogen, 14.32%. Calculated for this structure: Carbon, 55.66%; hydrogen, 5.19%; nitrogen, 14.42%: The melting point of the product of Example VII, 4-chloro-2-pyridine aldoxime, agreed quite closely with the melting point of 154°–155° C. reported by Furukawa (Yakugaku Zasshi 77, No. 1, 11 (1957)) for this compound. A mixed melting point with product prepared by an alternate route was not depressed. Elemental analysis of the product of Example VIII, 5-chloro-2-pyridine aldoxime, showed: Carbon, 45.74% hydrogen, 3.40%; nitrogen, 17.63%. Calculated for this structure: Carbon, 46.04%; hydrogen, 3.22%; nitrogen, 17.90%.

The preceding examples show the utility of the process of this invention. Only one reaction step is required to convert the 2-chloromethylpyridines to the corresponding aldoximes. With the aid of this invention, only two reaction steps are required to produce the aldoximes from the 2-methylpyridine N-oxides, whereas the classical method of the prior art requires more than two reaction steps. Furthermore, the solvents and the reactants other than the pyridine compounds are economical, readily available and easily and safely used. It will be obvious that simple equipment can be used for carrying out this process, whereas other methods known in the art, such as the oximation in liquid ammonia, require much more elaborate and expensive equipment.

In view of the close structural similiarities between 2-chloromethylpyridine and benzyl chloride, it is significant that benzyl chloride compositions are not similarly converted to the oximes of the corresponding benzaldehydes. As as example, treatment of p-chlorobenzyl chloride with hydroxylamine under conditions in accordance with this invention did not produce the oxime of p-chlorobenzaldehyde. The only identifiable product was N,N-bis(p-chlorobenzyl) hydroxylamine.

It is theorized that the overall reaction begins with nucleophilic displacement of the chloro group by hydroxylamine to produce the 2-pyridine methylhydroxylamine which suffers loss of water to produce the corresponding 2-pyridine aldimine. The aldimine reacts with additional hydroxylamine to produce the aldoxime. The stoichiometric requirement of two molar equivalents of hydroxylamine is consistent with this theory.

The preceding description and examples serve to teach how this invention is practiced and applied. Modifications and equivalents will be obvious to those skilled in the art. The invention is therefore to be limited only by the following claims.

We claim:

1. The process for the preparation of 2-pyridine aldoxime and subsituted 2-pyridine aldoximes with substituents selected from the group consisting of lower alkyl, carbethoxy and chloro which comprises:
   (a) reacting at elevated temperatures a 2-chloromethylpyridine with at least two molar equivalents of hydroxylamine in a mixture of water and a water-miscible organic solvent in which the 2-chloromethylpyridine is soluble, at a pH in the reaction mixture in the range of about 5 to 9, thereby producing the 2-pyridine aldoxime in the reaction mixture; and
   (b) separating the 2-pyridine aldoxime from the reaction mixture.

2. The process of claim 1 wherein the water-miscible organic solvent is a lower alkanol containing one to six carbon atoms.

3. The process of claim 1 wherein the water-miscible organic solvent is ethanol.

4. The process of claim 1 wherein the elevated temperature is in the range of about 65° C. to 120° C.

5. The process of claim 1 wherein the reaction mixture is maintained at the elevated temperature for one to six hours.

6. The process of claim 1 wherein hydroxylamine is supplied to the reaction mixture in the form of hydroxylamine hydrochloride.

7. The process of claim 6 wherein the water-miscible organic solvent is ethanol and the elevated temperature is in the range of about 65° C. to 120° C.

8. The process of claim 7 wherein the pH of the reaction mixture is adjusted to the range of about 5 to 9 by the presence of an inorganic base.

9. The process of claim 8 wherein the inorganic base is an alkali metal hydroxide.

10. The process of claim 9 wherein the 2-pyridine aldoxime product is separated from the reaction mixture by cooling the reaction mixture and filtering the crystallized product from the reaction mixture.

References Cited
UNITED STATES PATENTS 3,205,234   9/1965   Schumann _____ 260—296

HENRY R. JILES, Primary Examiner

A. L. ROTMAN, Assistant Examiner

U.S. Cl. X.R.

260—295, 295.5, 999

UNITED STATES PATENT OFFICE
CERTIFICATE OF CORRECTION

Patent No. 3,501,486          Dated March 17, 1970

Inventor(s) Arthur B. Ash, Francis A. Daniher and Brennie E. Hackley, Jr.

It is certified that error appears in the above-identified patent and that said Letters Patent are hereby corrected as shown below:

Column 1, the heading should read as follows:

Arthur B. Ash, Detroit, Michigan and Francis A. Daniher, Royal Oak, Michigan assignors to Ash Stevens, Inc. Detroit, Michigan, a Michigan Corporation.

SIGNED AND
SEALED
OCT 27 1970

(SEAL)
Attest:

Edward M. Fletcher, Jr.
Attesting Officer

WILLIAM E. SCHUYLER, JR.
Commissioner of Patents